April 30, 1963   E. W. BOLLMEIER ET AL   3,087,606
PACKAGE OF INTER-REACTIVE MATERIALS
Filed Oct. 19, 1953   2 Sheets-Sheet 1

FIG. 2-A

INVENTORS
EMIL WAYNE BOLLMEIER
LEO F. VOKATY
BY
Carpenter, Abbott, Coulter & Kinney
ATTORNEY April 30, 1963   E. W. BOLLMEIER ET AL   3,087,606
PACKAGE OF INTER-REACTIVE MATERIALS
Filed Oct. 19, 1953   2 Sheets-Sheet 2
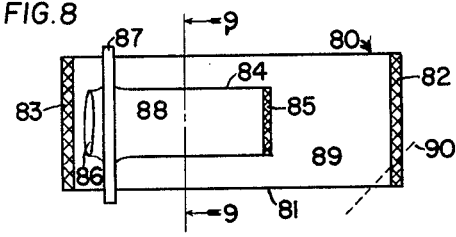
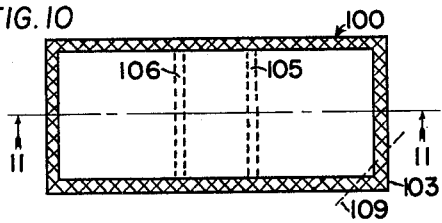
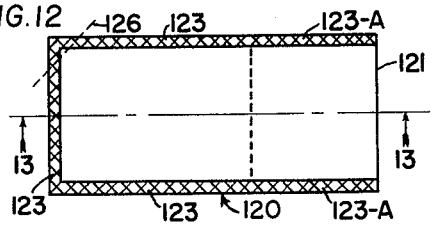
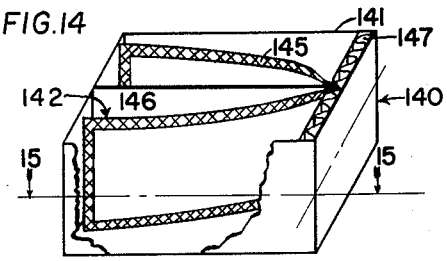
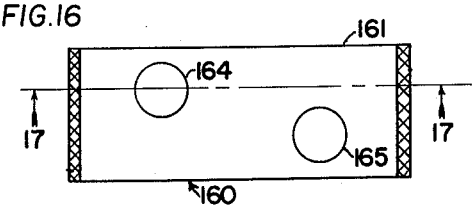
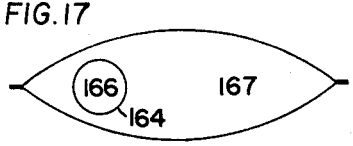
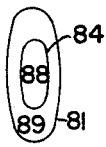
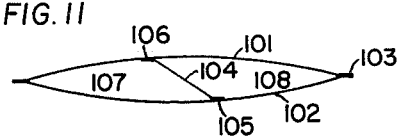
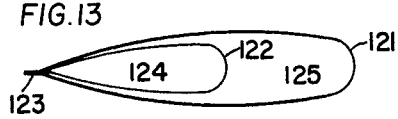
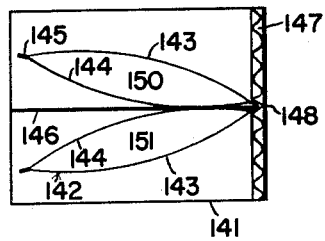
INVENTORS
EMIL WAYNE BOLLMEIER
LEO F. VOKATY
BY
Carpenter, Abbott, Coulter & Kinney
ATTORNEY

United States Patent Office 3,087,606
Patented Apr. 30, 1963

3,087,606
PACKAGE OF INTER-REACTIVE MATERIALS
Emil Wayne Bollmeier, Mendota Township, Dakota County, and Leo F. Vokaty, St. Paul, Minn., assignors to Minnesota Mining & Manufacturing Company, St. Paul, Minn., a corporation of Delaware
Filed Oct. 19, 1953, Ser. No. 386,992
19 Claims. (Cl. 206—47)

This invention relates to the packaging of liquid or plastic materials, and particularly to inter-reactive materials which, when mixed together, set up or cure to a heat-resistant, hard and tough state. The invention relates to the packaged products and to the manipulation thereof, and to various applications thereof, of which one in particular is of interest in connection with the protection and insulation of electrical and mechanical components.

One specific application of the novel package of this invention relates to the insulation and protection of wire splices or connections; and the invention will be at least in part, described in connection with such specific use.

Electrical coils, splices, and connections have previously been protected and insulated by means of thermoplastic impregnating agents or potting compounds having an asphaltic base. These compounds are subject to melting caused by heating of the coils or wires during use thereof, and resulting in flow of the insulating material away from its designated position.

Other prior art applications have employed heat-curing resinous or plastic compositions for coating or encapsulating various electrical components. Heat is required to cause the normally stable and non-reacting resinous material to cure to the non-thermoplastic state. The method is limited in its application due to the heat sensitivity of components of many electrical systems.

Another type of material which has previously been suggested for use in the coating or encapsulating of electrical or other components involves mixtures of two or more inter-reactive materials which set up or cure at room temperature when intimately mixed together. Highly reactive mixtures are necessary in order to attain desired production rates. Premixing of large quantities of the material is therefore precluded because of the danger of the material curing before it can be applied to the joint or connection.

Transfer of the reactive components from storage containers to weighing-pans and mixing-pans is difficult and untidy, resulting in waste of material and, even more significantly, in improper proportioning and mixing of the reactive materials. Opening the containers and dipping or otherwise transferring the mixtures to a separate vessel for mixing exposes the components to the atmosphere, in many cases resulting in excessive or noxious fumes, skin irritation and other personnel problems, and in degradation of the curing agent or resin.

These and other deficiencies and difficulties of the prior art are overcome by means of the present invention, which provides, in a single unitary package, accurately proportioned amounts of inter-reactive liquid or plastic materials which may be mixed without opening the package and may then be applied directly to the splice or other area, without waste and under positive pressure if desired, to form a protective coating. The package is simple and economical to produce and use, and the reactive components are maintained in a stable, non-reacted and inter-reactive state during prolonged periods of storage.

Many useful systems of inter-reactive liquid or plastic materials are known. One example is a combination of a solution in a volatile solvent of natural or synthetic rubber and a co-reactive solution of suitable low temperature accelerating and vulcanizing agents. Another system makes use of an alkyd resin as one component and a suitable catalyst mixture as a second component. The more recently developed epoxy resins may also be used in conjunction with solutions of reactants and catalysts, such as organic amines, carboxylic acid anhydrides, liquid polysulfide polymers and various combinations of such components which react with the epoxy resins, preferably at or near normal room temperatures, to form hard, tough, dense and impervious resinous materials.

The invention will be further described in connection with the drawings, in which:

FIGURE 1 is a representation, largely in cross-section, of a wire-splice, insulated and protected with a resinous composition applied from a unitary package as illustrated in cross-section in FIGURE 2, a modification of one portion of such package being illustrated in cross-section in FIGURE 2a.

FIGURES 6, 8, 10, 12 and 16 represent, in elevation, other varieties of unitary packages of multiple inter-reactive resinous components made in accordance with the present invention. FIGURES 5 and 7 represent end elevations of the packages of FIGURES 4 and 6, respectively, and FIGURES 9, 11, 13 and 17 represent cross-sectional views of the packages of FIGURES 8, 10, 12 and 16, respectively, and on the section-lines indicated.

FIGURE 14 is a view in perspective of still another type of package, shown in cross-section in FIGURE 15.

Figure 1:
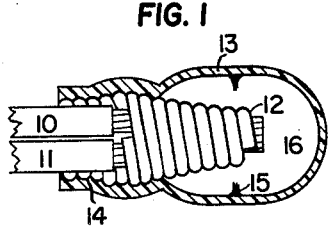

In FIGURE 1, the bare tips of the stranded conductors of insulated wires 10 and 11 are clamped together in a "pigtail" splice by means of a spring-wire connector 12. A flexible shell 13, surrounds the splice, with an internally threaded tip portion 14, closely conformed to the outer surfaces of the insulated wires adjacent the large end of the spring-wire connector. The interior of the shell 13 containing the splice is filled with a hardened resinous material 16, which also permeates the voids within the splice and connector, the shell 13 serving as a mold for the resinous material during curing thereof.

Figure 2:
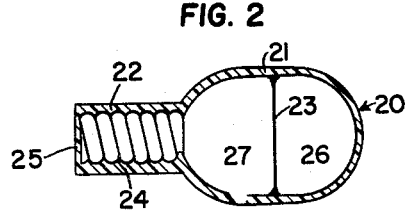

FIGURE 2 represents in cross-section a capsule 20, which consists of a bulb portion 21, inter-connected with a neck portion 22, the latter being closed at the outward end by a seal 25. The interior of the capsule is divided into two parts by a central diaphragm 23, and the two closed chambers thus formed contain the two inter-reactive liquid or plastic materials 26 and 27. The interior surface of the neck portion 22 is threaded, as shown at 24, to correspond with the outer surface of the spring-wire connector of FIGURE 1.

The diaphragm 23 of FIGURE 2 is adherently sealed to the inner surface of the outer wall of the bulb. An alternative structure is indicated in FIGURE 2a, showing a channel 28 in the interior surface of the wall of the bulb 21a, a resilient diaphragm 23a being fitted snugly within such channel.

In applying the capsule of FIGURE 2 to the splice, as indicated in FIGURE 1, the rear portion of the capsule, containing the reactive component 26, is compressed to an extent sufficient to rupture the diaphragm 23 (or displace the diaphragm 23a) and thus permit mixing of the reactive components 26 and 27. The rim of the ruptured diaphragm is indicated at 15 in FIGURE 1. Mixing is completed by alternately compressing the two ends of the capsule, the latter being made of flexible material and in a shape having less than the minimum ratio of external area to internal volume. After mixing is complete, the sealed end 25 is clipped from the neck portion 22, and the capsule is screwed on to the spring-wire connector 12 of the splice, as shown in FIGURE 1. Hydraulic pressure set up by this operation is sufficient to force the liquid or plastic resinous mixture into all of the openings and interstices between the elements of the splice, whereby complete and effective insulation and protection of the splice is attained. The resinous composition then rapidly sets up or cures to the final hard and tough state. It will be apparent that resinous compositions which are free, or essentially free, of volatile solvents are of greatest effectiveness in such operations.

Figure 3:
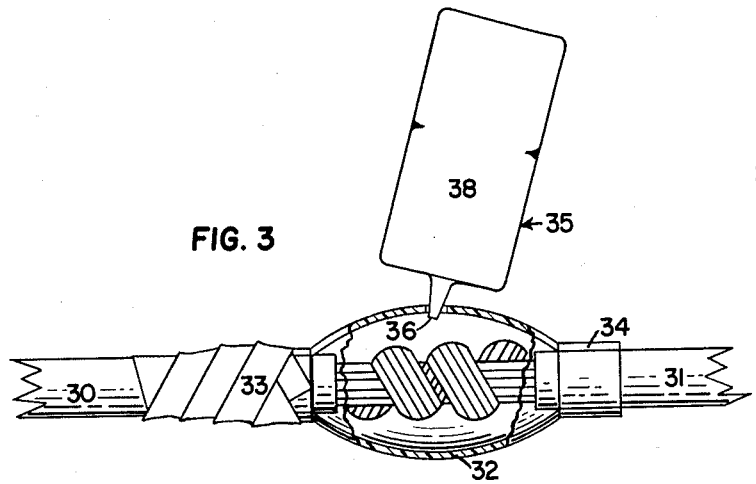
FIGURE 3 represents another method of insulating and protecting a wire-splice, employing a unitary package of resinous materials as illustrated in side elevation in FIGURE 4 and in end elevation in FIGURE 5.
Figure 3:
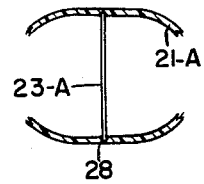

FIGURE 3 illustrates a line or running splice between two stranded conductors 30 and 31, which is protected and insulated with resinous material introduced from a capsule 35, and maintained in position during the curing period by a close fitting and preferably transparent shield 32. The shield is held in place on the outer surface of the conductor 30 by means of a wrapping of adhesive tape 33, and on the conductor 31 by the close-fitting elastic friction seal portion 34 of the shield 32. The shield is perforated so as to permit the entry of the open end tip 36 of the capsule 35, through which the pre-mixed resinous composition 38 is introduced, under pressure, into the sleeve and around the spliced areas of the conductors. Rather than employ a preformed fitted sleeve 32, suitable strips of plastic or elastic film or sheet material may be wound around the splice area, temporarily fastened in place on each of the conductors, and perforated to permit the entry of the resinous mixture.

Figure 4:
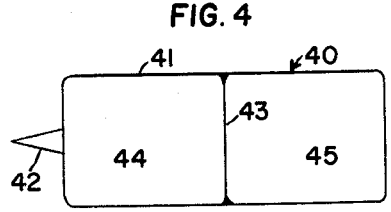
Figure 5:
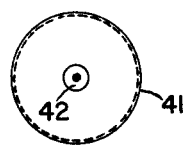

FIGURES 4 and 5 provide further detail in connection with the capsule 35 of FIGURE 3. The complete capsule, here designated 40, consists of a tubular portion 41, closed at both ends and having a protruding tip 42 at one end. A diaphragm 43 separates the interior of the capsule into two portions containing two inter-reactive liquid or plastic materials 44 and 45. Such a diaphragm may be constructed of the same material as the outer wall of the capsule 40 but in reduced thickness; or it may be made of some other impervious material. For example, the diaphragm 43 has been produced by inter-reaction of the two reactive components 44 and 45, e.g., where the latter were epoxy resin and amine catalyst mixtures, respectively. A resilient removable diaphragm of "Mylar" polyester film material is also effective, the structure in such case being similar to that indicated in FIGURE 2a. Pressure on either end of the capsule bulges the walls of the capsule at the opposite end and shatters or ruptures (or displaces) the diaphragm, thus permitting mixing of the two reactive components. The closed tip 42 is then cut off and the enclosed material applied to a splice as shown in FIGURE 3 or used for any other desired application.

Figure 6:
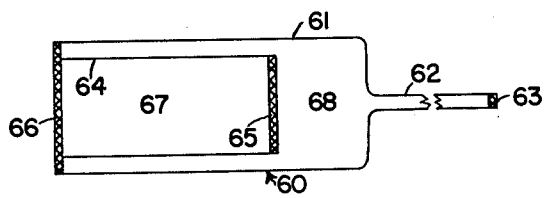
Figure 7:
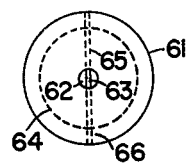

The two-compartment capsule 60 of FIGURES 6 and 7 consists of a larger outer tube 61, terminating at one end in an elongated small tube 62 having a sealed end 63, and enclosing an intermediate size tube 64, the two having a common sealed end 66. The intermediate tube 64 is closed at the other end with a seal 65, and this tube contains one component 67 of a two-component inter-reactive resinous system, the other component 68 of which is contained within the large tube 61 and around the outside of the intermediate tube 64. The walls of the large tube 61 and of the small terminal tube 62 are substantially thicker and stronger than the walls of the intermediate tube 64, and the latter tube is preferably filled to, or nearly to, capacity, so that external pressure applied adjacent the end seal 66 will cause rupture of the intermediate tube 64 while causing mere distortion of the external tube 61. The two reactive components are then thoroughly intermixed by manipulation of the outer tube, the sealed tip 63 is cut off, and the resin is applied where desired.

Where the bulb of the capsule of FIGURE 2 and the tube of the capsule of FIGURE 4 are of relatively thick and semi-rigid cross-section, the envelope of the outer tube 81 of the capsule 80 of FIGURES 8 and 9 may be of relatively thin and highly flexible film material. The tube 81 is closed at both ends with seals 82 and 83. A smaller thin-walled tube 84, closed at one end by a seal 85 but open at the other end as shown at 86, is located within the outer tube 81. The small tube 84 is maintained in closed condition near the open end 86 by means of an external clamp 87, which may consist of a pair of springy metal strips, suitably clamped or held together at each end, and overlying the entire width of the outer envelope 81 as shown. Separate components of the inter-reactive resinous material are contained within the inner tube 84 as indicated at 88, and within the outer tube 80 and around the inner tube as shown at 89. Removal of the external clamp 87 permits the reactive component 88 to be pressed from the inner tube through the open end 86 and to be mixed with the other reactive component 89 by manipulation of the flexible outer envelope. After mixing is complete, a corner of the outer envelope is cut off, as indicated by dotted line 90, and the reacting mixture is then squeezed from the envelope into any desired position. In this package the external clamp 87 provides a temporary barrier to prevent premature mixing of the components of the reactive mixture. It will be apparent that two or more of the smaller tubes may be employed in a single package, where more than two reactive components are required. The same is generally true of the other packages of this invention.

FIGURES 10 and 11 represent another example of a thin walled and highly flexible envelope or capsule, the envelope 100 being constructed of two co-extensive films 101 and 102, sealed together around their entire edges as shown at 103. Two compartments for the reactive components 107 and 108 are formed within the envelope by another thinner or weaker film 104, which is sealed to the upper film 101 at area 106 and to the lower film 102 at area 105. External pressure on either end compartment forces the liquid or plastic material contained therein against the barrier 104, which, due to its lesser thickness and lesser strength, then ruptures to permit intermixing of the two reactive components. The mixture is then pressed from the envelope through the opened corner formed by cutting along dotted line 109.

Another form of envelope, somewhat similar in construction but having additional advantages for some reactive systems, is illustrated in FIGURES 12 and 13. The package 120 consists of an inner envelope 122 containing one reactant 124, and an outer envelope 121 containing another reactant 125. The two envelopes have a common seal 123 extending along three sides of the smaller envelope, sealing of the larger envelope being completed by seals 123a. Alternatively, the inner envelope may be made narrower than the outer envelope and the two sealed separately along one or both sides, being joined with a common seal at the common end. As in the package of FIGURE 10, the separating membrane, in this case the inner envelope 122, is preferably of thinner and weaker sheet material than the outer package 121, although somewhat the same effect may be obtained by more completely filling the inner envelope. The mixture formed on bursting the inner envelope and massaging the capsule may be expelled from the bag through a corner cut as shown at 126.

Still a different construction is illustrated in FIGURES 14 and 15. A single envelope 142, formed of two relatively long and narrow strips 143 and 144 of suitable film material by means of a heat seal 145, contains the reactive components 150 and 151 in the two end compartments formed when the envelope is folded at the center. A suitable separator member 146 forces the folded edge into a slot 148 in a hinged clamping member 147, the whole being retained within a box or container 141. As illustrated, the separator 146 is a thin, stiff cardboard member, and the clamp member 147 is a section of corrugated cardboard which has been slit at one side along the line of contact with the separator 146 to form a hinged clamp. The entire assembly may be withdrawn from the box 141, whereupon the clamp and separator members fall away and the package 142 may then be manipulated to provide suitable mixing for the reactive components contained therein. The mixture is then expelled from the bag through an opened corner. The box 141 is shown in FIGURE 14 partly cut away to disclose the envelope contained therein; this box may also be fitted with a suitable cover, not shown. Where more than two reactive components, and hence more than two separate compartments are desired, it will be apparent that further clamp members may be arranged at the end of the box opposite clamp 147, together with suitable separator members, to provide means for separating an envelope of extended length into three or more separate compartments.

The outer envelope 161 of the package 160 of FIGURE 16 is similar to the previously described outer envelope 81 of FIGURE 8, and contains the reactive component 167 together with small enclosed spheres 164, 165 of one or more further reactive components 166. Since the spheres represent the minimum possible surface to volume ratio, pressure applied to them through the outer envelope 161 results in rupture of the spherical membrane and in intermixing of the contained reactant with the reactive material in the outer envelope. The size of the spheres may be reduced by increasing the number, so that rather strong spheres may be made even though the outer membrane thereof is relatively weak and frangible. A preferred method of making such spherical membranes is by forming the membrane in situ at the surface of a drop of the reactive liquid by reaction of such surface with a surrounding reactive liquid, somewhat as described in connection with the diaphragm 43 of the package of FIGURE 4.

Of the materials which may be employed in constructing these several packages or analogous pakages, flexible and heat-sealable inert organic materials such as polyethylene are preferred. Thin films of polyethylene are readily sealed together or welded by the application of controlled heat. The material is inert to, and insoluble in, many of the desirable resinous systems. It is flexible and strong, and is readily obtainable in sheets of various thicknesses. It may also be extruded or molded into any desired shape or form.

Another material which has been found useful, particularly in making the relatively thick-walled capsules of FIGURES 2, 4 and 6, is plasticized vinyl chloride; and a preferred method of making such capsules is by molding, casting or dipping from vinyl chloride plastisols. For example, a suitable form may be covered with a layer of a plastisol consisting of 100 parts of high molecular weight vinyl chloride polymer and 60 parts of dioctyl phthalate, and then heated to 250–400° F. to form a thick, homogeneous and flexible wall section. The open end may be heat-sealed. The internal separating membrane may be formed of the same vinyl chloride material, or of a less flexible, more waxy material, adhered directly to the walls of the capsule; or a resilient disc may be inserted as previously described in connection with FIGURE 2a; or the separating membrane may be formed as the interfacial reactant product of two reactive components within the package.

Cellulosic film materials, "Mylar" polyester films, rubber hydrochloride, and various other film-forming polymeric materials are also useful in making these novel packages, depending on the particular reactive system to be contained thereby, on the methods to be employed in producing the package, and on various other factors. Transparency is desirable, and the materials just listed possess this property; however, in many cases an opaque packaging material may be equally applicable and in some cases preferable, e.g., where exposure of the resinous components to actinic light is to be avoided. In the latter case, colored or pigmented organic films, or even metallic foils, suitably lined or treated where necessary for prevention of chemical attack, may be found useful. However the transparent organic films permit visual inspection of the contents during manipulation of the package and are much preferred.

Of the several inter-reactive systems previously noted herein, the epoxy resin systems are preferred for a number of applications and particularly for the insulating and protecting of electrical components. One example of such a system comprises 46 parts of "Epon" resin No. 562, a resinous material containing free epoxy groups and produced from bisphenol and epichlorohydrin, as one reactive component and a mixture of 46 parts "Thiokol LP–2", a liquid organic polysulfide polymer, with 8 parts of 2,4,6-tri(dimethylaminomethyl) phenol, as the other reactive component. The second of these two reactive components gives off irritating vapors which slowly penetrate and pass through many of the organic films above mentioned. However, the reaction product of the two reactive components has been found to be impervious to such vapors and to the liquid components, and to provide highly suitable retaining membranes. Packages of the type illustrated in FIGURES 6, 8, 12 and 16 are therefore preferred for this class of materials. In these packages it will be noted that one of the reactive components is completely, or substantially completely, surrounded by the other of the reactive components. Hence, the more volatile or migratory of the two components is placed within the inner container, and any volatilization or migration through the membrane then results in immediate reaction with the component in the outer compartment and in re-sealing of the membrane. In the case of the packages of FIGURES 2, 4 and 16, this reaction may be relied upon to provide the entire membrane, as previously described.

These same considerations apply with epoxy resin compositions in which other amine activators, such as diethylene triamine, are employed, since such amine compounds are particularly penetrative of many polymeric films.

For convenience in determining the extent of mixing of the inter-reactive components it has been found desirable to include in one or the other of said components an indicator, such as an aniline dye or an inert pigment such as carbon black, so that the completeness of mixing of the two or more materials may be visually determined.

While the invention has been described with particular reference to multiple-compartment packages of inter-reactive resin-forming liquid or plastic materials having utility in the field of electrical insulation, it will be apparent that the same packages are useful also in connection with many other inter-reactive materials and in many cases with non-reactive components where accurate proportioning, ease of handling, and other desirable qualities of these novel packages are of importance. The invention has also been related particularly to resin-forming liquid or plastic materials which are rapidly inter-reactive at or near normal room temperatures and are therefore highly suited to field applications where effective heat-curing methods are not available. However the novel packages of the invention are also applicable in the case of inter-reactive components which require heating to an elevated temperature for initiation or completion of the reaction.

What is claimed is as follows:

1. A multiple compartment, flexible, unitary package comprising a smaller flexible sealed inner envelope having a plurality of sealed edges, containing one liquid or plastic component, and enclosed within a larger flexible sealed outer envelope having a plurality of sealed edges and containing a liquid or plastic component inter-reactive with said one component, the two envelopes being sealed together at a common seal extending along three sides of the smaller envelope.

2. The package of claim 1 in which the one reactant component comprises a liquid epoxy resin and the component inter-reactive therewith comprises a liquid curing agent for said resin.

3. The package of claim 2 in which the liquid curing agent comprises an amine activator and a liquid organic polysulfide polymer.

4. A multiple compartment, flexible, unitary package of resin-forming reactants as defied in claim 3 in which the reactant components are differently colored and at least the outer envelope is transparent.

5. A multiple compartment, flexible, unitary package comprising a smaller flexible rupturable sealed inner envelope having a plurality of sealed edges and containing one liquid or plastic component in an amount sufficient to render the envelope relatively turgid, enclosed within a larger flexible sealed outer envelope having a plurality of sealed edges and containing a liquid or plastic component inter-reactive with said one component and in an amount sufficient to render said outer envelope relatively flaccid, the two envelopes being sealed together at a common seal extending along three sides of the smaller envelope.

6. A compartmented package that may be used for retaining and admixing a plurality of components and having at least two adjacent compartments separated by a rupturable sealing partition wall comprising: a sealed, flexible, rupturable bag having opposed, similarly-shaped lower and upper outer barrier walls secured to each other at their respective marginal edge portions, said barrier walls having opposed marginal side and end portions, said bag having at least two inner adjacent sealed compartments separated by a rupturable, compartment-forming, sealing partition wall having opposed marginal side and end portions positioned inside said bag, said partition wall having a lower rupturing strength than at least one of the outer barrier walls that form said bag, said sealing partition wall having opposed marginal side portions that are contiguous with opposed, contiguous marginal side portions of the outer barrier walls, one end portion of said partition wall being secured to one of the outer barrier walls along a line extending across the width of the bag, the other opposed end portion of said partition wall being secured to the other of said outer barrier walls along a line intermediate opposed end portions of the other of the said outer barrier walls so that the contiguous marginal side portions of the outer barrier walls and sealing partition wall are contiguous and are secured to each other in sealing relationship; and wherein each of said adjacent compartments contains a component of a polymerizable mixture so that a polymerizable mixture results when said components are mixed within the confines of the bag.

7. A compartmented package as set forth in claim 6 wherein one component comprises a liquid epoxy resin and another component, inter-reactive therewith, comprises a liquid curing agent for said resin.

8. The package of claim 7 in which the liquid curing agent comprises an amine activator and a liquid organic polysulfide polymer.

9. A compartmented package that may be used for retaining and admixing a plurality of components and having two adjacent compartments separated by a rupturable sealing partition wall comprising: a sealed, flexible, rupturable bag having opposed, similarly shaped lower and upper outer barrier walls secured to each other at their respective marginal edge portions, said barrier walls having opposed marginal side and end portions, said bag having two inner adjacent sealed compartments separated by a short, rupturable, compartment-forming, sealing partition wall having opposed marginal side and end portions positioned inside said bag, said partition wall having a lower rupturing strength than the outer barrier walls that form said bag, said sealing partition wall having opposed marginal side portions that are contiguous with opposed, contiguous marginal side portions of the outer barrier walls, one end portion of said partition wall being secured to the upper outer barrier wall along a line intermediate opposed end portions of said upper wall, the other opposed end portion of said partition wall being secured to the lower outer barrier wall along a line intermediate opposed end portions of said lower wall, so that the contiguous marginal side portions of the outer barrier walls and sealing partition wall are contiguous and are secured to each other in sealing relationship; and wherein each of said adjacent compartments contains a component of a polymerizable mixture so that a polymerizable mixture results when said components are mixed within the confines of the bag.

10. A compartmented package as set forth in claim 9 wherein the component in one of said adjacent compartments is a liquid resinous component and the component in the other of said adjacent compartments is a liquid curing agent for said resinous component, said components when mixed within the confines of the bag resulting in a temporarily liquid polymerizable mixture capable of permeating the voids of electrical wire-splices and of then polymerizing to a hard, tough, dense and impervious resinous insulative and protective coating.

11. A method of packaging an epoxy resin and a curing agent therefor comprising partly filling a container with a liquid epoxy resin, adding to the partly filled container as a substantially separate layer above and in interfacial contact with the said resin a liquid curing agent therefor, and maintaining the container in a relatively quiescent condition so as to avoid intermixing of the two layers for a sufficient period of time to cause the formation of an impermeable film of cured resin by the interaction of the resin and the curing agent at the interface between the two layers.

12. A package including a container, a layer of liquid epoxy resin and a layer of curing agent for said resin therein, the said layers being separated from each other by an impermeable film produced by the interaction in situ of said resin and said curing agent.

13. A method of packaging an epoxy resin and a curing agent therefor comprising partly filling a container with a liquid epoxy resin, adding to the partly filled container as a substantially separate layer above and in interfacial contact with the said resin a liquid curing agent therefor, said curing agent being of lower density than said resin, and maintaining the container in a relatively quiescent condition so as to avoid intermixing of the two layers for a sufficient period of time to cause the formation of an impermeable film of cured resin by the interaction of the resin and the curing agent at the interface between the two layers.

14. A method of packaging an epoxy resin and a curing agent therefor comprising partly filling a container with a liquid epoxy resin, adding to the partly filled container as a substantially separate layer above and in interfacial contact with the said resin a liquid curing agent therefor, said curing agent having a viscosity differing from the viscosity of said resin, and maintaining the container in a relatively quiescent condition so as to avoid intermixing of the two layers for a sufficient period of time to cause the formation of an impermeable film of cured resin by the interaction of the resin and the curing agent at the interface between the two layers.

15. A method of packaging an epoxy resin and a curing agent therefor comprising charging into a container, as separate layers therein with interfacial contact, said resin and said curing agent, and maintaining the container in a relatively quiescent condition so as to avoid intermixing of the two layers for a sufficient period of time to cause the formation of an impermeable film of cured resin by the interaction of the resin and the curing agent at the interface between the two layers.

16. A method of packaging an epoxy resin comprising charging into a container a liquid epoxy resin produced by the condensation of bis-phenol-A and epichlorohydrin, then adding to the container as a substantially separate layer above and in interfacial contact with said resin a liquid curing agent comprising a tertiary amine and maintaining the container in a relatively quiescent condition so as to avoid intermixing of the two layers for a sufficient period of time to cause the formation of an impermeable film of cured resin by the interaction of the resin and the curing agent at the interface between the two layers.

17. A package including a container, removable closure means associated with said container, a layer of liquid epoxy resin and a layer of curing agent for said resin within said container, the said layers being separated from each other by an impermeable film produced by the interaction in situ of said resin and said curing agent.

18. A package including a container, a layer of liquid epoxy resin, and a quantity of curing agent for said resin in the form of at least one globular inclusion therein and separated therefrom by an impermeable film produced by the interaction in situ of said resin and said curing agent.

19. A package including a flexible molded plastic container, a layer of liquid epoxy resin and a layer of curing agent for said resin therein, the said layers being separated from each other by an impermeable film produced by the interaction in situ of said resin and said curing agent.

References Cited in the file of this patent

UNITED STATES PATENTS

| | | |
|---|---|---|
| 462,990 | Oppenheimer | Nov. 10, 1891 |
| 2,168,757 | Ballard et al. | Aug. 8, 1939 |
| 2,281,473 | Brewer | Apr. 28, 1942 |
| 2,305,903 | Scott et al. | Dec. 22, 1942 |
| 2,401,110 | Rohdin | May 28, 1946 |
| 2,506,486 | Bender | May 2, 1950 |
| 2,527,992 | Greenberg | Oct. 31, 1950 |
| 2,562,402 | Winsten | July 31, 1951 |
| 2,601,703 | Sawyer | July 1, 1952 |
| 2,605,896 | Rohdin | Aug. 5, 1952 |
| 2,687,130 | Cohen | Aug. 24, 1954 |
| 2,701,392 | Eich | Feb. 8, 1955 |
| 2,714,974 | Sawyer | Aug. 9, 1955 |